United States Patent
Komuro et al.

(10) Patent No.: US 11,836,993 B2
(45) Date of Patent: Dec. 5, 2023

(54) METHOD FOR CONTROLLING VEHICLE, VEHICLE CONTROL DEVICE, AND STORAGE MEDIUM

(71) Applicant: HONDA MOTOR CO., LTD., Tokyo (JP)

(72) Inventors: Misa Komuro, Wako (JP); Yosuke Sakamoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 245 days.

(21) Appl. No.: 17/195,676

(22) Filed: Mar. 9, 2021

(65) Prior Publication Data
US 2021/0291828 A1  Sep. 23, 2021

(30) Foreign Application Priority Data

Mar. 18, 2020  (JP) .................. 2020-047468

(51) Int. Cl.
*G06V 20/56* (2022.01)
*B60W 30/095* (2012.01)
(Continued)

(52) U.S. Cl.
CPC .......... *G06V 20/588* (2022.01); *B60W 10/20* (2013.01); *B60W 30/09* (2013.01);
(Continued)

(58) Field of Classification Search
CPC ............ B60W 30/0956; B60W 10/20; B60W 30/09; B60W 30/146; B60W 40/04;
(Continued)

(56) References Cited

U.S. PATENT DOCUMENTS 8,994,823 B2 * 3/2015 Goto .................. G06V 20/58
348/148
10,747,219 B2 * 8/2020 Sakamoto ............ G05D 1/0088
(Continued)

FOREIGN PATENT DOCUMENTS

CN  104210489  12/2014
CN  108974010  12/2018
(Continued)

OTHER PUBLICATIONS

Machine Translation of Langner's reference (DE-102015206335-A1) (Year: 2016).*
(Continued)

*Primary Examiner* — Tarek Elarabi
(74) *Attorney, Agent, or Firm* — AMIN, TUROCY & WATSON, LLP

(57) ABSTRACT

A the method for controlling a vehicle: recognizing at least a position of a traffic participant around a vehicle and a road environment around the traffic participant, setting a risk region for the traffic participant based on at least the recognized position of the traffic participant, correcting the set risk region based on a width of a sidewalk where the traffic participant is present or a width of a roadway around the traffic participant which is the recognized road environment, and controlling a speed and steering of the vehicle based on the corrected risk region.

8 Claims, 15 Drawing Sheets

(51) Int. Cl.
  *B60W 30/09*  (2012.01)
  *B60W 30/14*  (2006.01)
  *B60W 40/04*  (2006.01)
  *B60W 10/20*  (2006.01)
  *G06V 10/80*  (2022.01)
  *G06V 40/10*  (2022.01)
  *G06V 20/58*  (2022.01)

(52) U.S. Cl.
  CPC ...... *B60W 30/0956* (2013.01); *B60W 30/146* (2013.01); *B60W 40/04* (2013.01); *G06V 10/803* (2022.01); *B60W 2554/4029* (2020.02); *B60W 2554/4041* (2020.02); *B60W 2554/80* (2020.02); *G06V 20/58* (2022.01); *G06V 40/10* (2022.01)

(58) Field of Classification Search
  CPC ............. B60W 2554/4041; B60W 2554/4029; B60W 2554/80
  See application file for complete search history.

(56) References Cited

U.S. PATENT DOCUMENTS

| | | | |
|---|---|---|---|
| 2013/0010112 A1* | 1/2013 | Goto | ........................ H04N 7/18 348/148 |
| 2013/0033368 A1 | 2/2013 | Fukamachi | |
| 2017/0061203 A1 | 3/2017 | Takatani et al. | |
| 2018/0348752 A1* | 12/2018 | Sakamoto | .............. G06V 20/58 |
| 2019/0221115 A1* | 7/2019 | Masuike | ................... G08G 1/09 |
| 2019/0283742 A1 | 9/2019 | Kawabe et al. | |
| 2021/0284141 A1* | 9/2021 | Sugaya | ................. G08G 1/166 |
| 2022/0169245 A1* | 6/2022 | Hieida | .................. B60W 30/09 |

FOREIGN PATENT DOCUMENTS

| | | |
|---|---|---|
| CN | 110271543 | 9/2019 |
| DE | 102015206335 A1 * | 10/2016 |
| JP | 2005-263036 | 9/2005 |
| JP | 2009-012602 | 1/2009 |
| JP | 2017-049687 | 3/2017 |
| JP | 2018-055272 | 4/2018 |
| JP | 2018-205907 | 12/2018 |
| JP | 2020-013173 | 1/2020 |
| WO | 2011/129014 | 10/2011 |

OTHER PUBLICATIONS

Chinese Office Action for Chinese Patent Application No. 202110278197.5 dated Aug. 16, 2023.

Japanese Office Action for Japanese Patent Application No. 2020-047468 dated Oct. 3, 2023.

* cited by examiner

| ATTRIBUTE | RISK REGION |
|---|---|
| ADULT | 01 |
| ADULT + UMBRELLA | 02 |
| ADULT + SUITCASE | 03 |
| ADULT + STROLLER | 04 |
| CHILD | 05 |
| ⋮ | ⋮ |

| ENVIRONMENT TO BE CORRECTED | CORRECTION PATTERN |
|---|---|
| GUARDRAIL | 001 |
| WIDTH OF SIDEWALK IS EQUAL TO OR GREATER THAN THRESHOLD VALUE | 002 |
| ROAD WIDTH IS EQUAL TO OR GREATER THAN THRESHOLD VALUE | 003 |
| NUMBER OF LANES IS EQUAL TO OR GREATER THAN THRESHOLD VALUE | 004 |
| GUARDRAIL + ROAD WIDTH IS EQUAL TO OR GREATER THAN THRESHOLD VALUE | 005 |
| ⋮ | ⋮ |

| LINK | ENVIRONMENT | CORRECTION PATTERN |
|---|---|---|
| RI001 | GUARDRAIL | 001 |
| RI002 | WIDTH OF SIDEWALK IS EQUAL TO OR GREATER THAN THRESHOLD VALUE | 002 |
| RI003 | ROAD WIDTH IS EQUAL TO OR GREATER THAN THRESHOLD VALUE | 003 |
| RI004 | NUMBER OF LANES IS EQUAL TO OR GREATER THAN THRESHOLD VALUE | 004 |
| RI005 | GUARDRAIL + ROAD WIDTH IS EQUAL TO OR GREATER THAN THRESHOLD VALUE | 005 |
| ⋮ | ⋮ | ⋮ |

METHOD FOR CONTROLLING VEHICLE, VEHICLE CONTROL DEVICE, AND STORAGE MEDIUM

CROSS-REFERENCE TO RELATED APPLICATION

Priority is claimed on Japanese Patent Application No. 2020-047468 filed on Mar. 18, 2020, the content of which is incorporated herein by reference.

FIELD

The present invention relates to, a method for controlling a vehicle, a vehicle control device, and a storage medium.

BACKGROUND

In the related art, a processing device that sets a wider second boundary region in a case where another stopped vehicle is present on one side of a road in a width direction, a pedestrian is present on other side of the road in the width direction, and at least any one of a sidewalk, a curb, and a guardrail is present than a first boundary region in a case where another stopped vehicle is present on one side of the road in the width direction and a pedestrian is not present on other side of the road in the width direction with respect to the other vehicle has been disclosed (Japanese Unexamined Patent Application, First Publication No. 2018-205907).

However, the above-described device may not be able to set an appropriate risk area for a vehicle to travel. Since a vehicle travels on the basis of the risk region, traveling may not be suitable for an occupant.

SUMMARY

The present invention is contrived in view of the above-described circumstances, and an object thereof is to provide a method for controlling a vehicle, a vehicle control device, and a storage medium which are capable of improving an occupant's feeling while riding in a vehicle.

A method for controlling a vehicle, a vehicle control device, and a storage medium, according to the invention adopt the following configurations.

(1) A vehicle control method according to an aspect of the invention is a vehicle control method including recognizing at least a position of a traffic participant around a vehicle and a road environment around the traffic participant, setting a risk region for the traffic participant based on at least the recognized position of the traffic participant, correcting the set risk region based on a width of a sidewalk where the traffic participant is present or a width of a roadway around the traffic participant which is the recognized road environment, and controlling a speed and steering of the vehicle based on the corrected risk region.

(2) In an aspect according to (1), the traffic participant is a pedestrian.

(3) In an aspect according to (1) or (2), further comprising: in a case where the width of the sidewalk is larger than a first width, correcting the risk region so that the risk region becomes narrower than a risk region which is set in a case where the width of the sidewalk is the first width.

(4) In an aspect according to any one of (1) to (3), further comprising: performing correction so that the risk region becomes narrower as the width of the sidewalk increases.

(5) In an aspect according to any one of (1) to (4), further comprising: in a case where the width of the roadway is larger than a second width, correcting the risk region so that the risk region becomes narrower than a risk region which is set in a case where the width of the roadway is the second width.

(6) In an aspect according to any one of (1) to (5), further comprising: performing correction so that the risk region becomes narrower as the width of the roadway increases.

(7) In an aspect according to any one of (1) to (6), further comprising: controlling the vehicle so that the vehicle does not enter the risk region.

(8) In an aspect according to any one of (1) to (7), further comprising: estimating an attribute of a recognized pedestrian, and set the risk region in consideration of the estimated attribute of the traffic participant.

(9) A vehicle control device is a vehicle control device including a recognizer configured to recognize at least a position of a pedestrian around a vehicle and a road environment around the pedestrian, and a controller configured to control a speed and steering of the vehicle based on at least the position of the pedestrian and the road environment recognized by the recognizer, and the controller controls the vehicle so that the vehicle travels at a position distant from the pedestrian at a first distance in a width direction of a road in a case where a width of a sidewalk where a pedestrian is present included in the road environment recognized by the recognizer is a third width, and controls the vehicle so that the vehicle travels at a position distant from the pedestrian at a second distance shorter than the first distance in the width direction of the road in a case where the width of the sidewalk where the pedestrian is present, which is the road environment recognized by the recognizer, is a fourth width larger than the third width.

(10) A vehicle control device is a vehicle control device including a recognizer configured to recognize at least a position of a pedestrian around a vehicle and a road environment around the pedestrian, and a controller configured to control a speed and steering of the vehicle based on at least the position of the pedestrian and the road environment recognized by the recognizer, and the controller controls the vehicle so that the vehicle travels at a position distant from the pedestrian at a third distance in a width direction of a road in a case where a width of a roadway around a position where the pedestrian is present, which is the road environment recognized by the recognizer, is a fifth width, and controls the vehicle so that the vehicle travels at a position distant from the pedestrian at a fourth distance shorter than the third distance in the width direction of the road in a case where the width of the roadway where the pedestrian included in the road environment recognized by the recognizer is present is a sixth width larger than the fifth width.

(11) A non-transitory computer readable storage medium that store a program to be executed by a computer to perform at least recognize at least a position of a traffic participant around a vehicle and a road environment around the traffic participant, set a risk region for the traffic participant based on at least the recognized position of the traffic participant, correct the set risk region based on a width of a sidewalk where the traffic participant is present or a width of a roadway around the traffic participant which is the recognized road environment, and control a speed and steering of the vehicle based on the corrected risk region.

(12) A vehicle control device is a vehicle control device including a recognizer configured to recognize at least a position of a traffic participant around a vehicle and a road environment around the traffic participant, a setter configured to set a risk region for the traffic participant based on at least the position of the traffic participant which is recognized by the recognizer, a corrector configured to correct the risk region set by the setter based on a width of a sidewalk where the traffic participant is present or a width of a roadway around the traffic participant which is the road environment recognized by the recognizer, and a controller that controls a speed and steering of the vehicle based on the risk region corrected by the corrector.

According to (1) to (7), (11), and (12), the method for controlling a vehicle, the vehicle control device or the storage medium can improve an occupant's feeling while riding in a vehicle by correcting a risk region based on the width of a sidewalk or the width of a roadway around a traffic participant and controlling the speed and steering of the vehicle based on the corrected risk region.

According to (8), the method for controlling a vehicle, the vehicle control device or the storage medium can set a risk region based on a pedestrian by setting the risk region based on the pedestrian's attribute.

According to (9) and (10), the method for controlling a vehicle, the vehicle control device or the storage medium can improve an occupant's feeling while riding in a vehicle by determining a position where the vehicle is to travel based on the width of a sidewalk width or the width of a roadway.

BRIEF DESCRIPTION OF THE DRAWINGS

FIG. 3 is a diagram showing an example of details of attribute information.

FIG. 4 is a diagram showing an example of details of correction information.

FIG. 12 is a diagram showing an example of details of correction information according to a second embodiment.

DETAILED DESCRIPTION

Hereinafter, embodiments of a method for controlling a vehicle, a vehicle control device, and a storage medium of the present invention will be described with reference to the drawings.

First Embodiment

[Overall Configuration]

Figure 1:
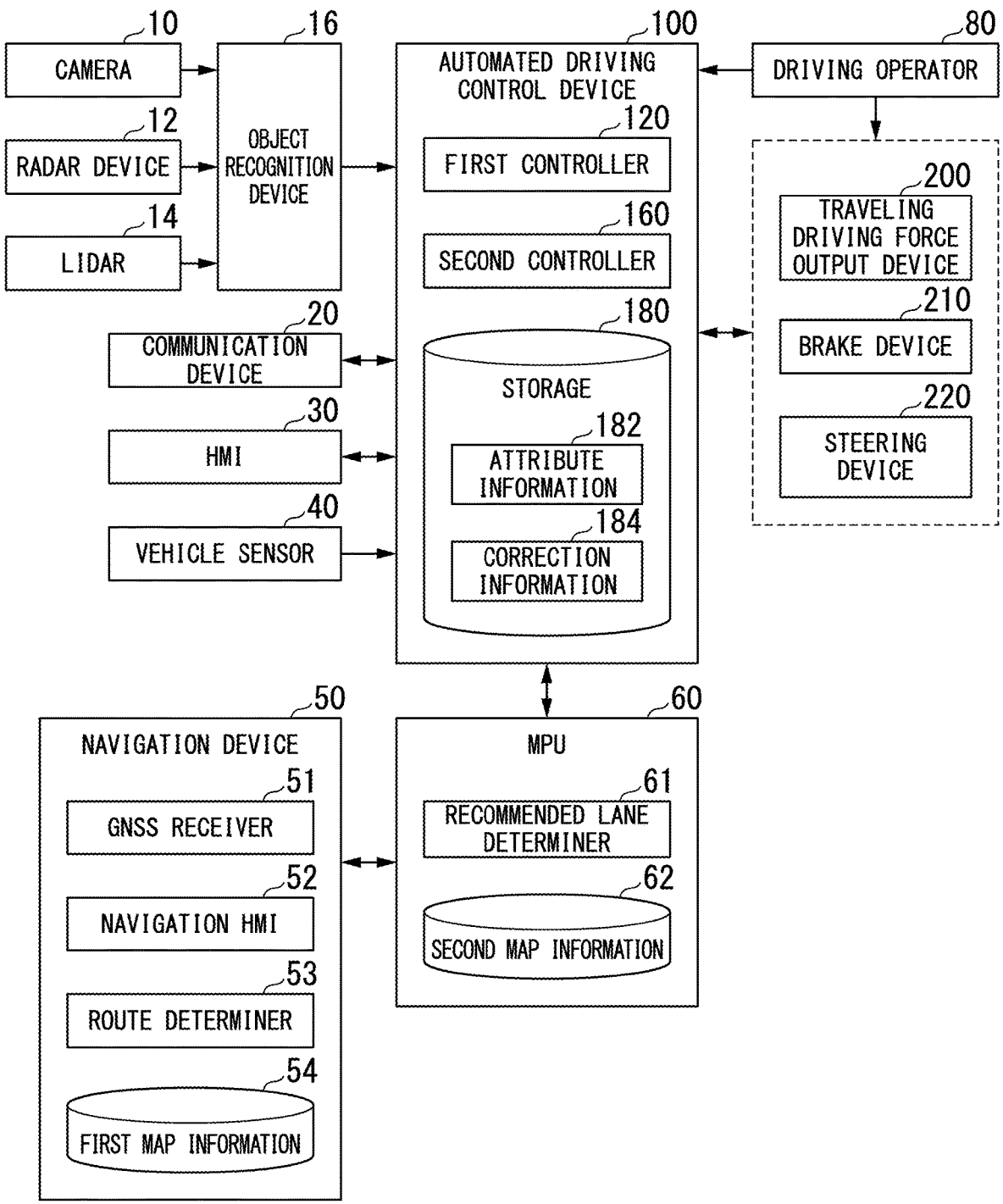
FIG. 1 is a configuration diagram of a vehicle system using a vehicle control device according to an embodiment.

FIG. 1 is a configuration diagram of a vehicle system 1 using a vehicle control device according to an embodiment. A vehicle having the vehicle system 1 mounted thereon is a vehicle such as a two-wheeled, three-wheeled, or four-wheeled vehicle, and a driving source thereof is an internal combustion engine such as a diesel engine or a gasoline engine, an electric motor, or a combination thereof. The electric motor operates using electric power generated by a generator connected to the internal combustion engine or electric power discharged by a secondary battery or a fuel cell.

The vehicle system 1 includes, for example, a camera 10, a radar device 12, a light detection and ranging (LIDAR) 14, an object recognition device 16, a communication device 20, a human machine interface (HMI) 30, a vehicle sensor 40, a navigation device 50, a map positioning unit (MPU) 60, a driving operator 80, an automated driving control device 100, a traveling driving force output device 200, a brake device 210, and a steering device 220. These devices and apparatuses are connected to each other through a multiple communication line such as a controller area network (CAN) communication line, a serial communication line, a wireless communication network, or the like. The components shown in FIG. 1 are merely examples, and some of the components may be omitted, or other components may be further added The camera 10 is a digital camera using a solid state imaging device such as a charge coupled device (CCD) or a complementary metal oxide semiconductor (CMOS). The camera 10 is attached to any location of the vehicle having the vehicle system 1 mounted thereon (hereinafter, a host vehicle M). In a case where a front side is imaged, the camera 10 is attached to an upper portion of a front windshield or the back side of a rearview mirror. For example, the camera 10 periodically and repeatedly images the periphery of the host vehicle M. The camera 10 may be a stereo camera.

The radar device 12 radiates radio waves such as millimeter waves to the periphery of the host vehicle M, and also detects radio waves (reflected waves) reflected by an object to detect at least the position (distance and orientation) of the object. The radar device 12 is attached to any location of the host vehicle M. The radar device 12 may detect the position and speed of the object by a frequency modulated continuous wave (FM-CW) method.

The LIDAR 14 irradiates the periphery of the host vehicle M with light (or electromagnetic waves having a wavelength close to light) to measure scattered light. The LIDAR 14 detects a distance to a target on the basis of a period of time from light emission to light reception. The emitted light is, for example, a pulsed laser beam. The LIDAR 14 is attached to any location of the host vehicle M.

The object recognition device 16 performs sensor fusion processing on detection results obtained by some or all of the camera 10, the radar device 12, and the LIDAR 14 to recognize the position, type, speed, and the like of an object. The object recognition device 16 outputs recognition results to the automated driving control device 100. The object recognition device 16 may output detection results of the camera 10, the radar device 12, and the LIDAR 14 to the automated driving control device 100 as they are. The object recognition device 16 may be omitted from the vehicle system 1.

The communication device 20 communicates with another vehicle which is present in the vicinity of the host vehicle M using, for example, a cellular network, a Wi-Fi network, Bluetooth (registered trademark), dedicated short range communication (DSRC), or the like, or communicates with various servers through a wireless base station.

The HMI 30 presents various information to an occupant of the host vehicle M and receives the occupant's input operation. The HMI 30 includes various display devices, a speaker, a buzzer, a touch panel, a switch, a key, and the like.

The vehicle sensor 40 includes a vehicle speed sensor that detects the speed of the host vehicle M, an acceleration sensor that detects an acceleration, a yaw rate sensor that detects an angular velocity around a vertical axis, an orientation sensor that detects the orientation of the host vehicle M, and the like.

The navigation device 50 includes, for example, a global navigation satellite system (GNSS) receiver 51, a navigation HMI 52, and a route determiner 53. The navigation device 50 stores first map information 54 in a storage device such as a hard disk drive (HDD) or a flash memory. The GNSS receiver 51 specifies the position of the host vehicle M on the basis of a signal received from a GNSS satellite. The position of the host vehicle M may be specified or complemented by an inertial navigation system (INS) using an output of the vehicle sensor 40. The navigation HMI 52 includes a display device, a speaker, a touch panel, a key, and the like. A portion or the entirety of the navigation HMI 52 may be the same as that of the HMI 30 mentioned above. The route determiner 53 determines, for example, a route (hereinafter, a map route) from the position of the host vehicle M which is specified by the GNSS receiver 51 (or any input position) to a destination input by an occupant using the navigation HMI 52 with reference to first map information 54. The first map information 54 is information in which, for example, a road shape is expressed by a link indicating a road and a node connected by the link. The first map information 54 may include the curvature of a road, point of interest (POI) information, and the like. The map route is output to the MPU 60. The navigation device 50 may perform route guidance using the navigation HMI 52 on the basis of the map route. The navigation device 50 may be realized by a function of a terminal device such as a smartphone or a tablet terminal which is owned by an occupant. The navigation device 50 may transmit the present position and a destination to a navigation server through the communication device 20 and acquire a route equivalent to the map route from the navigation server.

The MPU 60 includes, for example, a recommended lane determiner 61, and stores second map information 62 in a storage device such as an HDD or a flash memory. The recommended lane determiner 61 divides a map route provided from the navigation device 50 into a plurality of blocks (for example, divided every 100 [m] in a vehicle moving direction), and determines a recommended lane for each block with reference to the second map information 62. The recommended lane determiner 61 determines on which lane from the left a vehicle is to travel. In a case where a branch location is present in the map route, the recommended lane determiner 61 determines a recommended lane so that the host vehicle M can travel through a reasonable route for moving to a branch destination.

The second map information 62 is map information with higher accuracy than the first map information 54. The second map information 62 includes, for example, information on the centers of lanes, information on boundaries of lanes, and the like.

The second map information 62 may include road information, traffic regulation information, address information (addresses and postal code numbers), facility information, telephone number information, and the like. The second map information 62 may be updated at any time by the communication device 20 communicating with other devices.

The driving operator 80 includes, for example, an acceleration pedal, a brake pedal, a shift lever, a steering wheel, a deformed steering wheel, a joystick, and other operators. A sensor that detects the amount of operation or whether or not an operation has been performed is attached to the driving operator 80, and detection results thereof are output to the automated driving control device 100, or some or all of the traveling driving force output device 200, the brake device 210, and the steering device 220.

The automated driving control device 100 includes, for example, a first controller 120, a second controller 160, and a storage 180. Each of the first controller 120 and the second controller 160 is realized by a hardware processor such as a central processing unit (CPU) executing a program (software). Some or all of these components may be realized by a hardware (a circuit unit; a circuitry is included) such as a large scale integration (LSI), an application specific integrated circuit (ASIC), a field-programmable gate array (FPGA), or a graphics processing unit (GPU), or may be realized by software and hardware in cooperation. The program may be stored in advance in a storage device (a storage device including a non-transitory storage medium) such as the HDD or the flash memory of the automated driving control device 100, or may be stored in a detachable storage medium such as a DVD or a CD-ROM and installed in the HDD or the flash memory of the automated driving control device 100 by the storage medium (non-transitory storage medium) being mounted on a drive device. The automated driving control device 100 is an example of a "vehicle control device".

The storage 180 is realized by, for example, an HDD, a flash memory, an electrically erasable programmable read only memory (EEPROM), a read only memory (ROM), or a random access memory (RAM), or the like. For example, attribute information 182 and correction information 184 are stored in the storage 180. Details of the information will be described later.

Figure 2:
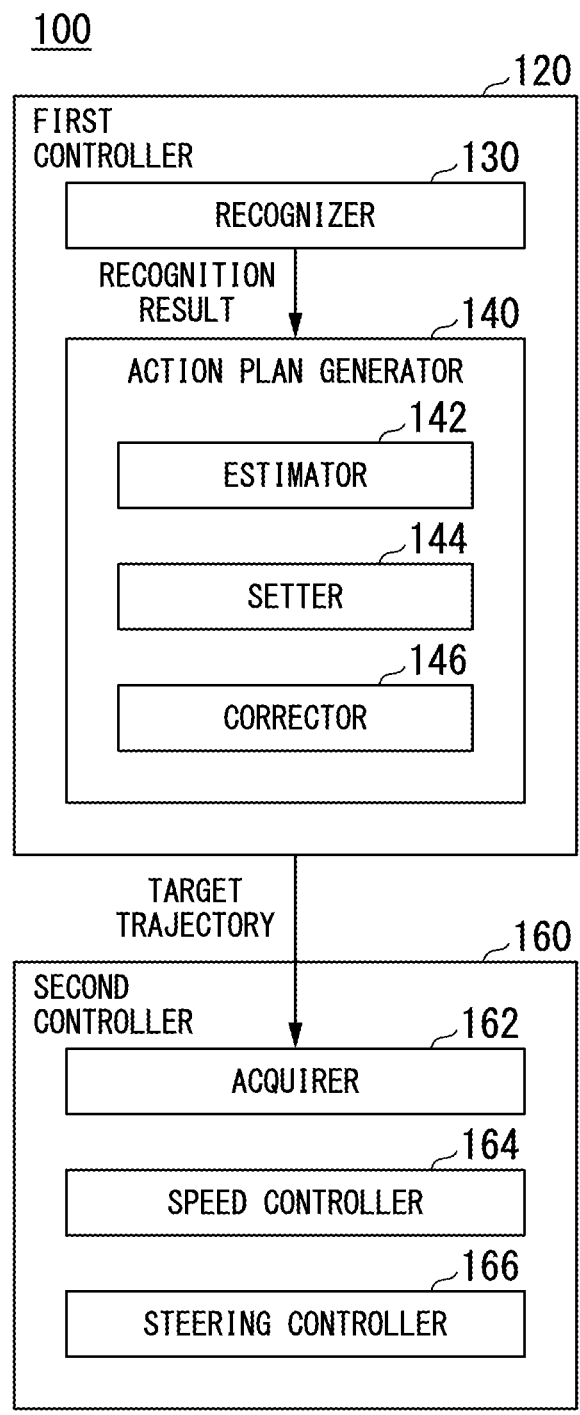
FIG. 2 is a functional configuration diagram of a first controller and a second controller.

FIG. 2 is a functional configuration diagram of the first controller 120 and the second controller 160. The first controller 120 includes, for example, a recognizer 130 and an action plan generator 140. The first controller 120 realizes, for example, a function based on artificial intelligence (AI) and a function based on a model, which is given in advance, in parallel. For example, a "function of recognizing an intersection" is executed by recognition of an intersection through deep learning or the like and recognition based on conditions given in advance (a signal capable of matching patterns, road marking, and the like) in parallel, or may be realized by scoring both sides and evaluating them comprehensively. Thereby, the reliability of automated driving is secured.

The recognizer 130 recognizes the position of an object in the vicinity of the host vehicle M, and states such as a speed and an acceleration on the basis of information input from the camera 10, the radar device 12, and the LIDAR 14 through the object recognition device 16. The position of the object is recognized as, for example, a position on absolute coordinates with a representative point (the center of gravity, the center of a drive axis, or the like) of the host vehicle M as the origin, and is used for control. The position of the object may be represented by a representative point such as the center of gravity or a corner of the object, or may be represented by an expressed region. The "state" of the object may include the acceleration or jerk of the object, or an "action state" (for example, whether or not the object is changing lanes or is attempting to change lanes).

The recognizer 130 recognizes, for example, a lane (traveling lane) on which the host vehicle M is traveling. For example, the recognizer 130 recognizes a traveling lane by comparing a pattern (for example, arrangement of solid lines and dashed lines) of road division lines obtained from the second map information 62 with a pattern of road division lines around the host vehicle M recognized from an image captured by the camera 10. The recognizer 130 may recognize the traveling lane by recognizing not only a road division line but also a traveling road boundary (road boundary) including a road division line, a road shoulder, a curb, a median strip, a guardrail, and the like. In this recognition, the position of the host vehicle M obtained from the navigation device 50 and processing results obtained by an INS may be added. The recognizer 130 recognizes stop lines, obstacles, red lights, tollhouses, and other road events. The recognizer 130 recognizes, for example, a guardrail, the width of a sidewalk, the width of a roadway, the number of lanes of a road, and the like.

The recognizer 130 recognizes the position and posture of the host vehicle M with respect to a traveling lane at the time of recognizing the traveling lane. For example, the recognizer 130 may recognize a deviation of a reference point of the host vehicle M from the center of the lane and an angle formed with respect to a line connecting the center of the lane in a moving direction of the host vehicle M as a relative position and posture of the host vehicle M with respect to the traveling lane. Alternatively, the recognizer 130 may recognize the position of the reference point of the host vehicle M with respect to any one side end portion of the traveling lane (a road division line or a road boundary), or the like as a relative position of the host vehicle M with respect to the traveling lane.

The action plan generator 140 generates a target trajectory for the host vehicle M to automatically travel in the future (without depending on a driver's operation) so that the host vehicle M travels in a recommended lane determined by the recommended lane determiner 61 in principle and can cope with surrounding circumstances of the host vehicle M. The target trajectory includes, for example, a speed element. For example, the target trajectory is expressed as a sequence of points at which the host vehicle M is to arrive (trajectory point). The trajectory point is a point at which the host vehicle M is to arrive every predetermined mileage (for example, approximately several [m]) at a distance along the road, and apart from this, a target speed and a target acceleration every predetermined sampling time (for example, approximately 0.x [sec]) are generated as a portion of the target trajectory. The trajectory point may be a position where the host vehicle M is to arrive at the sampling time every predetermined sampling time. In this case, information on the target speed and the target acceleration is expressed at intervals of trajectory points.

The action plan generator 140 may set automated driving events when a target trajectory is generated. The automated driving events include a constant speed driving event, a low speed following driving event, a lane change event, a branching event, a merging event, a takeover event, and the like. The action plan generator 140 generates a target trajectory corresponding to a started event.

The action plan generator 140 includes, for example, an estimator 142, a setter 144, and a corrector 146. Details of these functional units will be described later.

The second controller 160 controls the traveling driving force output device 200, the brake device 210, and the steering device 220 so that the host vehicle M passes through the target trajectory generated by the action plan generator 140 at scheduled time.

Referring back to FIG. 2, the second controller 160 includes, for example, an acquirer 162, a speed controller 164, and a steering controller 166. The acquirer 162 acquires information on the target trajectory (trajectory point) generated by the action plan generator 140 and stores the acquired information in a memory (not shown). The speed controller 164 controls the traveling driving force output device 200 or the brake device 210 on the basis of a speed element accompanying the target trajectory stored in the memory. The steering controller 166 controls the steering device 220 in accordance with the degree of curvature of the target trajectory stored in memory. Processes of the speed controller 164 and the steering controller 166 are realized by, for example, a combination of feedforward control and feedback control. As an example, the steering controller 166 executes feedforward control based on the curvature of a road in front of the host vehicle M and feedback control based on a deviation from the target trajectory in combination.

The traveling driving force output device 200 outputs a traveling driving force (torque) for a vehicle to travel to driving wheels. The traveling driving force output device 200 includes, for example, a combination of an internal combustion engine, an electric motor, a gearbox, and the like and an electronic controller (ECU) that controls them. The ECU controls the above-described components in accordance with information input from the second controller 160 or information input from the driving operator 80.

The brake device 210 includes, for example, a brake caliper, a cylinder that transmits oil pressure to the brake caliper, an electric motor that generates oil pressure in the cylinder, and a brake ECU. The brake ECU controls the electric motor in accordance with information input from the second controller 160 or information input from the driving operator 80, and causes a brake torque according to a braking operation to be output to each wheel. The brake device 210 may include a mechanism that transmits oil pressure generated in accordance with an operation of the brake pedal included in the driving operator 80 to the cylinder through a master cylinder as a backup. The brake device 210 is not limited to the above-described configuration, and may be an electronically controlled hydraulic brake device that controls an actuator according to the information input from the second controller 160 to transmit oil pressure of the master cylinder to the cylinder.

The steering device 220 includes, for example, a steering ECU and an electric motor. The electric motor applies a force to, for example, a rack and pinion mechanism to change the direction of the steering wheel. The steering ECU drives the electric motor in accordance with information input from the second controller 160 or information input from the driving operator 80 to change the direction of the steering wheel.

[Process of Setting Risk Region]

The automated driving control device 100 sets a risk region for a traffic participant recognized by the recognizer 130 on the basis of at least the position of the traffic participant, and corrects the risk region set by the setter 144 on the basis of the width of a sidewalk in which the traffic participant is present or the width of a roadway around the traffic participant, which is a road environment recognized by the recognizer 130. When the risk region is set, the attribute of the traffic participant may be added. In addition, the automated driving control device 100 controls the speed and steering of the vehicle M on the basis of the risk region corrected by the corrector 146.

The "risk region" is a region in which a risk potential is set. The "risk potential" is an index value indicating the degree of a risk in a case where the vehicle M enters the region in which the risk potential is set. The risk region is a region in which a risk potential which is an index value of a predetermined size (an index value exceeding zero) is set.

The "traffic participant" includes a pedestrian, an animal, a bicycle, and other mobile objects. In the following description, the traffic participant is assumed to be a pedestrian.

(Process of Estimating Attribute of Traffic Participant)

The estimator 142 estimates an attribute of a pedestrian recognized by the recognizer 130. The estimator 142 estimates the attribute of the pedestrian with reference to the attribute information 182. FIG. 3 is a diagram showing an example of details of the attribute information 182. The attribute information 182 is, for example, information in which a risk region is associated with an attribute of a pedestrian.

The attribute of the pedestrian includes the attribute of the pedestrian himself or herself and an attribute of a target in which the attribute of the pedestrian and the attribute of an object accompanied by the pedestrian are combined. The attribute of the pedestrian is, for example, the attribute of an adult, a child, an adult holding an umbrella, an adult holding a suitcase, an adult pushing a stroller, or the like. The risk region associated with the attribute has a size or a shape varying for each attribute. For example, a risk region set for a child is larger than a risk region set for an adult. For example, a risk region set for a pedestrian who accompanies an object is larger than a risk region set for a pedestrian who does not accompany an object.

The estimator 142 may estimate an attribute of a pedestrian by performing template matching on the basis of an image obtained by capturing the pedestrian and a template of a pedestrian for each attribute stored in the storage 180 in advance, may input the image to a learned model, and may estimate the attribute of the pedestrian on the basis of a result output by the learned model. The learned model is a model that outputs an attribute of a pedestrian included in an image when the image is input.

(Process of Setting Risk Region)

The setter 144 sets a risk region associated with an attribute estimated by the estimator 142. The setter 144 sets a risk region on the basis of a moving direction (or the orientation of the body) of a pedestrian in addition to the attribute estimated by the estimator 142. For example, the setter 144 makes a risk region set in the moving direction of the pedestrian larger than a risk region set in a direction opposite to the moving direction of the pedestrian. The moving direction of the pedestrian is derived on the basis of a history of positions of a pedestrian in the past.

(Process Related to Correction of Risk Region)

The corrector 146 determines whether or not an environment in the vicinity of a position where a pedestrian is present matches a correction condition. In a case where the environment matches the correction condition, the corrector 146 corrects a risk region on the basis of a correction pattern based on the matching correction condition. For example, in a case where the corrector 146 determines that the environment in the vicinity of a position where the pedestrian is present matches an environment included in the correction information 184, the corrector 146 corrects a risk region on the basis of the correction pattern associated with the environment with reference to the correction information 184.

FIG. 4 is diagram showing an example of details of the correction information 184. The correction information 184 is information in which a correction pattern of a risk region is associated with an environment to be corrected. The environment to be corrected is, for example, an environment in which a guardrail is present between a sidewalk and a roadway, an environment in which the width of a sidewalk is equal to or greater than a threshold value, an environment in which a road width of a roadway in the vicinity of a location where a pedestrian is present is equal to or greater than a threshold value, an environment in which the number of lanes of a road in the vicinity of a location where a pedestrian is present is equal to or greater than a threshold value, an environment in which two or more environments among the above-described environments are combined, or the like. The correction pattern is, for example, a pattern in which at least a risk region in front of a pedestrian is reduced by a predetermined percentage, a pattern in which a risk region protruding toward a roadway is deleted, or the like.

The action plan generator 140 controls the vehicle M so that the vehicle M does not enter a risk region corrected by the corrector 146, thereby causing the vehicle M to pass by a pedestrian.

Specific Example 1

Figure 5:
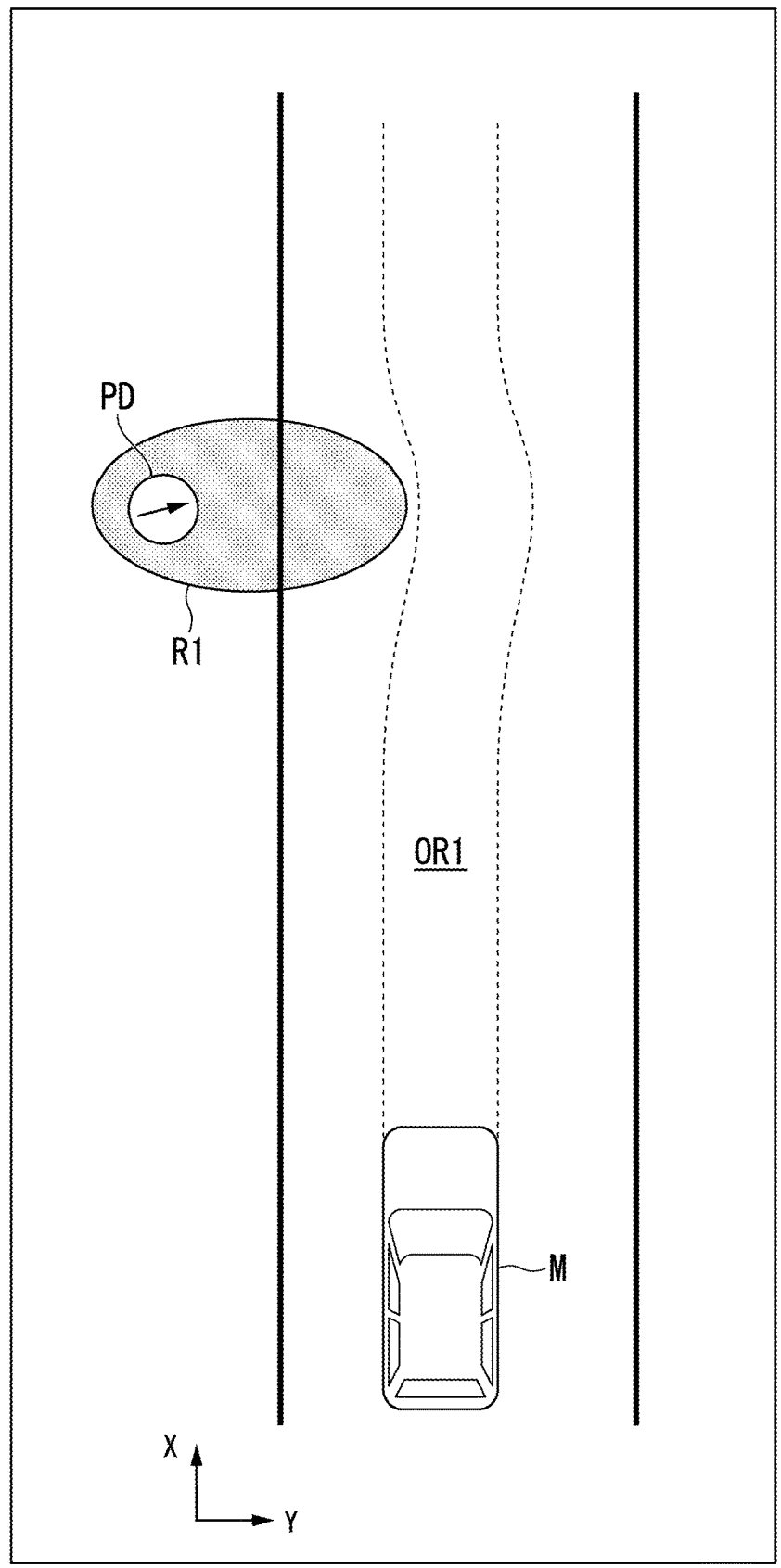
FIG. 5 is a diagram showing an example of a risk region which is set in a case where a guardrail is not present.

FIG. 5 is a diagram showing an example of a risk region which is set in a case where a guardrail is not present. The setter 144 sets a risk region on the basis of an attribute of a pedestrian PD and a moving direction of the pedestrian PD. The risk region overlaps the future scheduled traveling track of the vehicle M. In this case, the vehicle M sets a scheduled traveling track OR1 for avoiding the risk region and travels along the scheduled traveling track.

Figure 6:
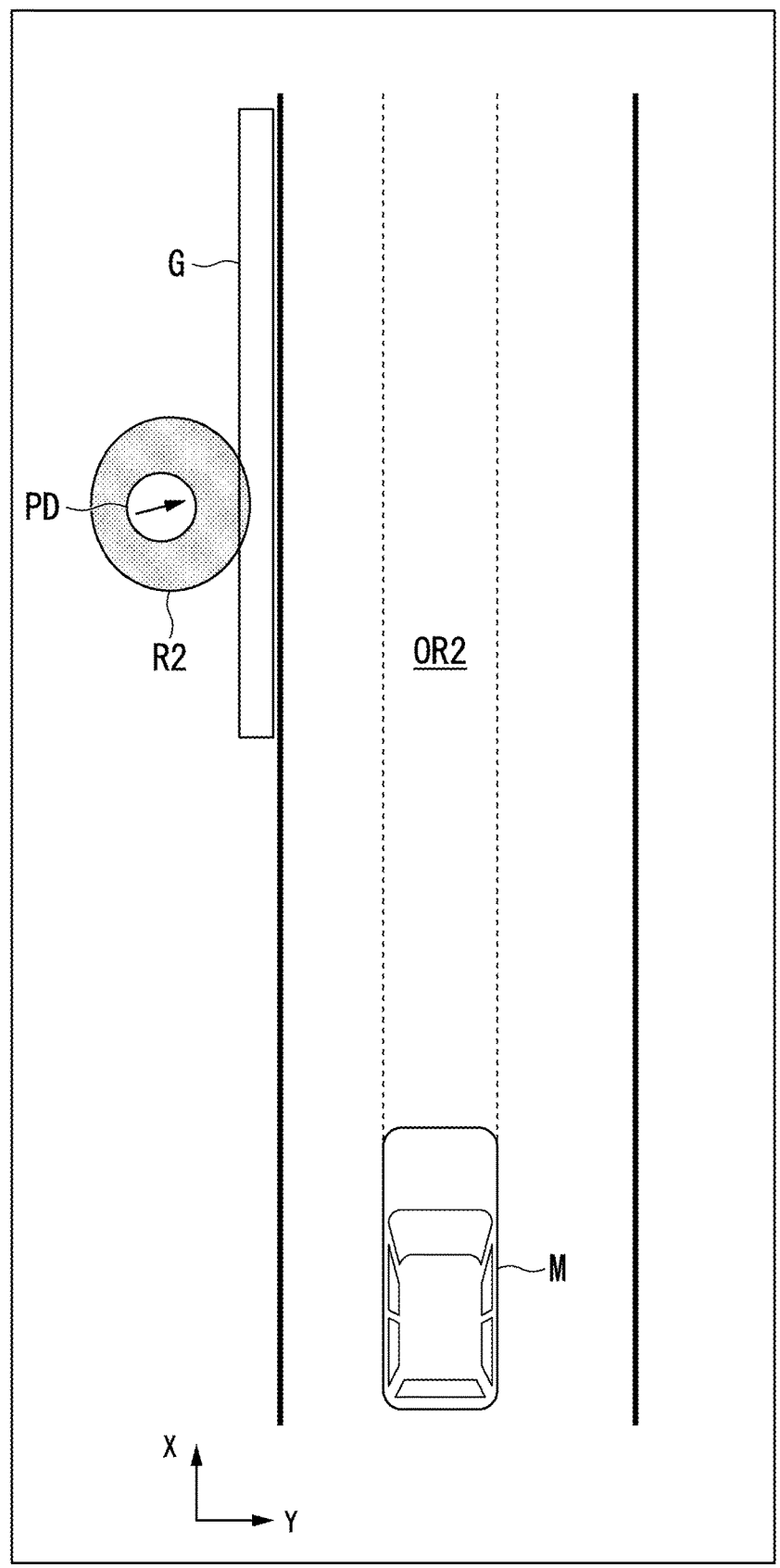
FIG. 6 is a diagram showing an example of a risk region which is set in a case where a guardrail is present.

FIG. 6 is a diagram showing an example of a risk region which is set in a case where a guardrail is present. FIG. 6 is different from FIG. 5 in that a guardrail is present between a roadway and a sidewalk. In a case where a guardrail G is present, the corrector 146 corrects a risk region R1 to a risk region R2. The risk region R2 is a region smaller than the risk region R1 and is a risk region corrected not to protrude toward a roadway. The risk region R2 does not overlap the future scheduled traveling track of the vehicle M. In this case, the vehicle M sets a scheduled traveling track OR1 for traveling straight ahead on a road and travels along the scheduled traveling track.

In a case where a guardrail is present as described above, there is a low probability that the pedestrian PD will enter a roadway, and thus a risk region based on the possibility is set. The vehicle M can travel on a road on the basis of a risk region according to the surrounding environment.

Specific Example 2

In a case where the width of a sidewalk is larger than a first width, the corrector 146 corrects a risk region so that the risk region becomes narrower than a risk region which is set in a case where the width of a sidewalk is the first width. For example, the first width is a width equal to or greater than a threshold value. The corrector 146 may perform correction so that a risk region becomes narrower as the width of a sidewalk increases. For example, the corrector 146 may narrow the risk region in a stepwise manner in accordance with the width of the sidewalk.

Figure 7:
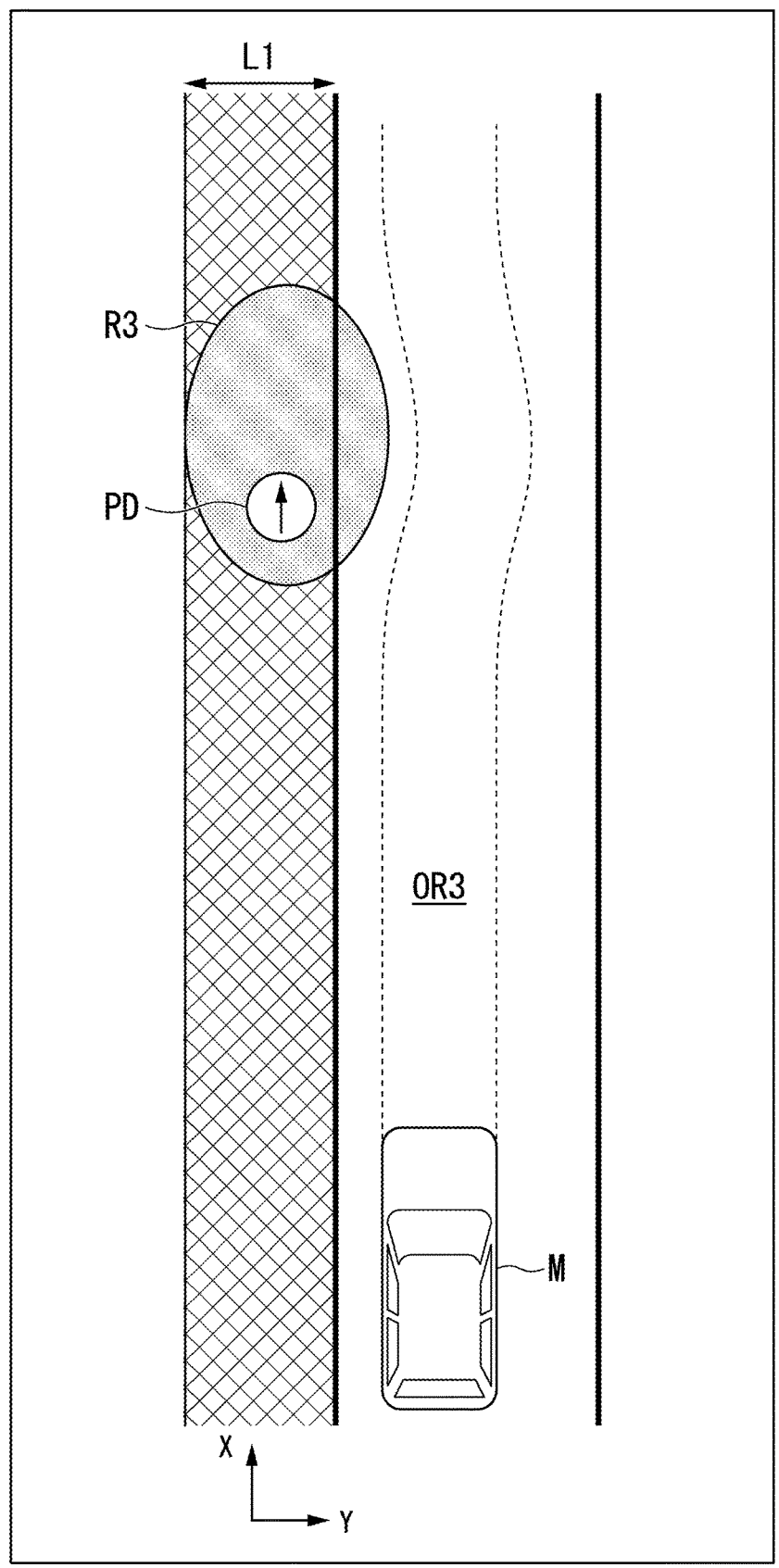
FIG. 7 is a diagram showing an example of a risk region which is set in a case where the width of a sidewalk is less than a threshold value (a case where the width of the sidewalk is a width L1).

FIG. 7 is a diagram showing an example of a risk region which is set in a case where the width of a sidewalk is less than a threshold value (a case where the width of the sidewalk is a width L1). The setter 144 sets a risk region on the basis of an attribute of a pedestrian PD and a moving direction of the pedestrian PD. The risk region overlaps the future scheduled traveling track of the vehicle M. In this case, the vehicle M sets a scheduled traveling track OR3 for avoiding the risk region and travels along the scheduled traveling track.

Figure 8:
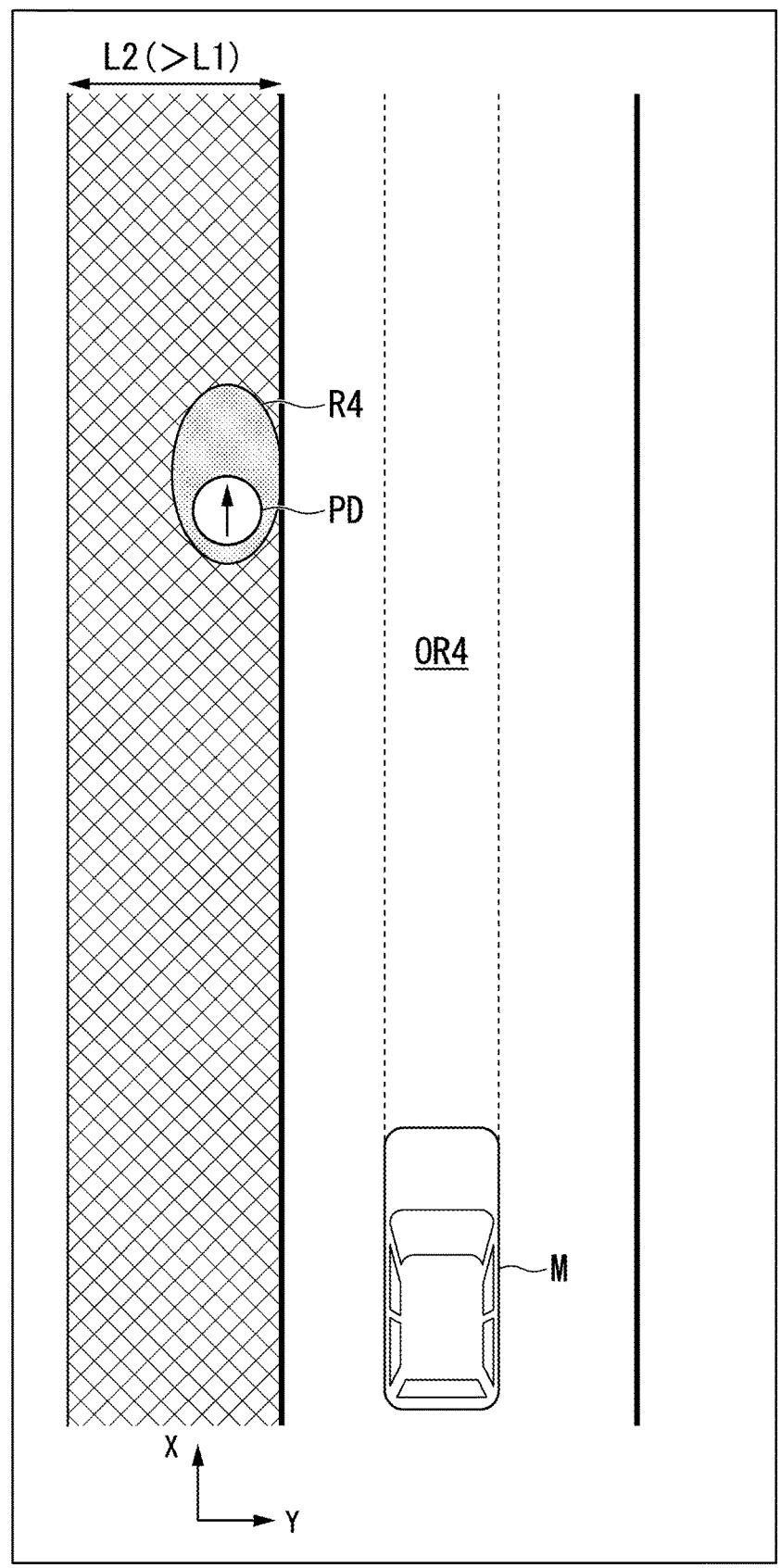
FIG. 8 is a diagram showing an example of a risk region which is set in a case where the width of a sidewalk is equal to or greater than a threshold value (a case where the width of the sidewalk is a width L2).

FIG. 8 is a diagram showing an example of a risk region which is set in a case where the width of a sidewalk is equal to or greater than a threshold value (a case where the width of the sidewalk is a width L2). FIG. 8 is different from FIG. 7 in that the width of the sidewalk is equal to or greater than the threshold value. In a case where the width of the sidewalk is equal to or greater than the threshold value, the corrector 146 corrects a risk region R3 to a risk region R4. The risk region R4 is a region smaller than the risk region R3 and is a risk region corrected not to protrude toward a roadway. The risk region R4 does not overlap the future scheduled traveling track of the vehicle M. In this case, the vehicle M sets a scheduled traveling track OR4 for traveling straight on a road and travels along the scheduled traveling track.

In a case where the width of a sidewalk is equal to or greater than a threshold value as described above, there is a low probability that the pedestrian PD will enter a roadway, and thus a risk region is set based on this probability. This is because, when the width of the sidewalk is relatively large, the pedestrian can pass by other pedestrians within the sidewalk, for example, even when the pedestrian passes by other pedestrians, or the pedestrian can avoid an obstacle within the sidewalk even when there is an obstacle within the sidewalk. The vehicle M can travel on a road on the basis of a risk region according to the surrounding environment.

Specific Example 3

In a case where the width of a roadway is larger than a second width, the corrector 146 corrects a risk region so that the risk region becomes narrower than a risk region which is set in a case where the width of the roadway is the second width. For example, the second width is a width equal to or greater than a threshold value. The corrector 146 may perform correction so that the risk region becomes narrower as the width of the roadway increases. For example, the corrector 146 may narrow the risk region in a stepwise manner in accordance with the width of the roadway.

Figure 9:
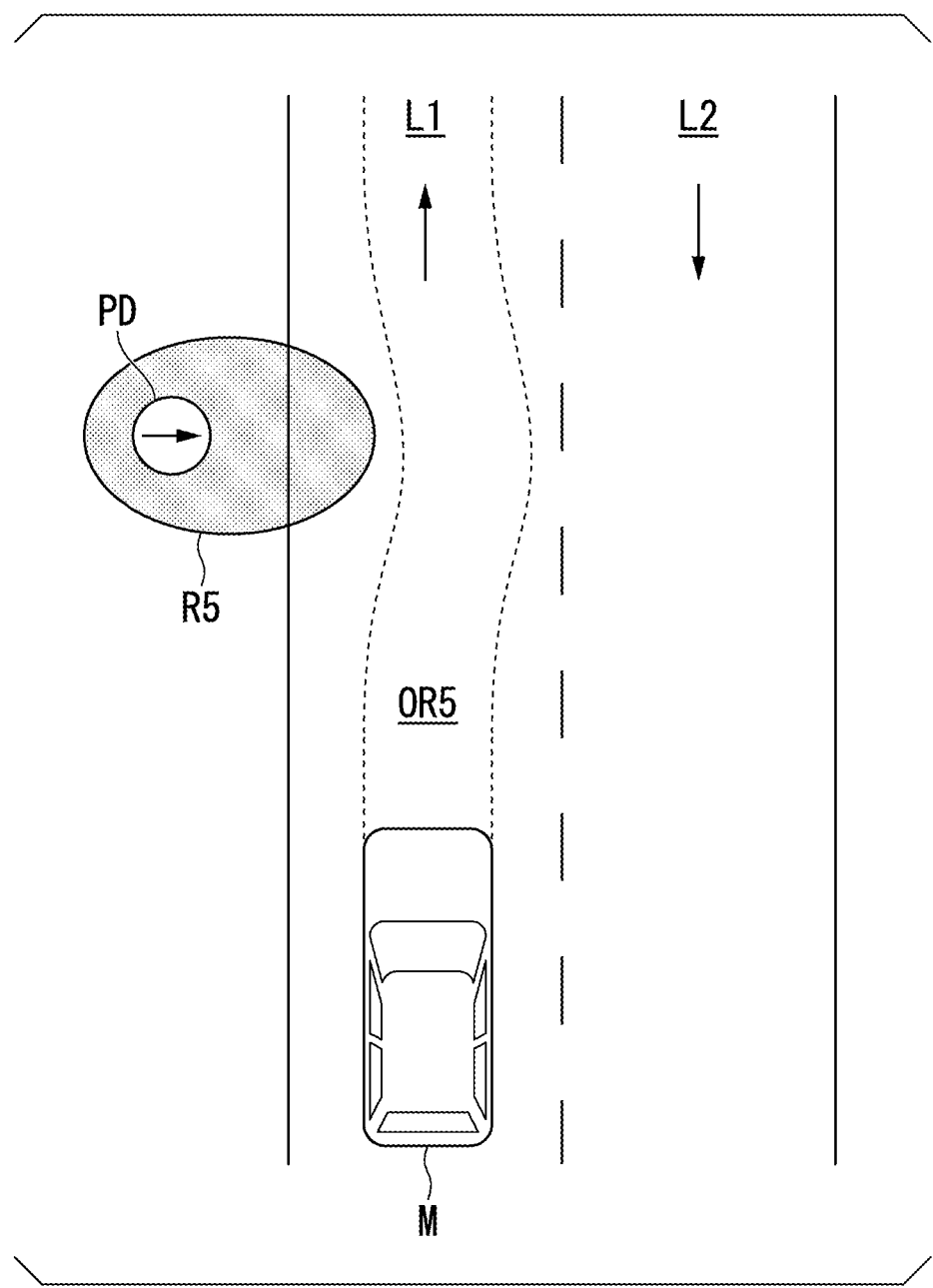
FIG. 9 is a diagram showing an example of a risk region which is set in a case where the width of a roadway is less than a threshold value.

FIG. 9 is a diagram showing an example of a risk region which is set in a case where the width of a roadway is less than a threshold value. The setter 144 sets a risk region on the basis of an attribute of a pedestrian PD and a moving direction of the pedestrian PD. The risk region overlaps the future scheduled traveling track of the vehicle M. In this case, the vehicle M sets a scheduled traveling track OR5 for avoiding the risk region and travels along the scheduled traveling track.

Figure 10:
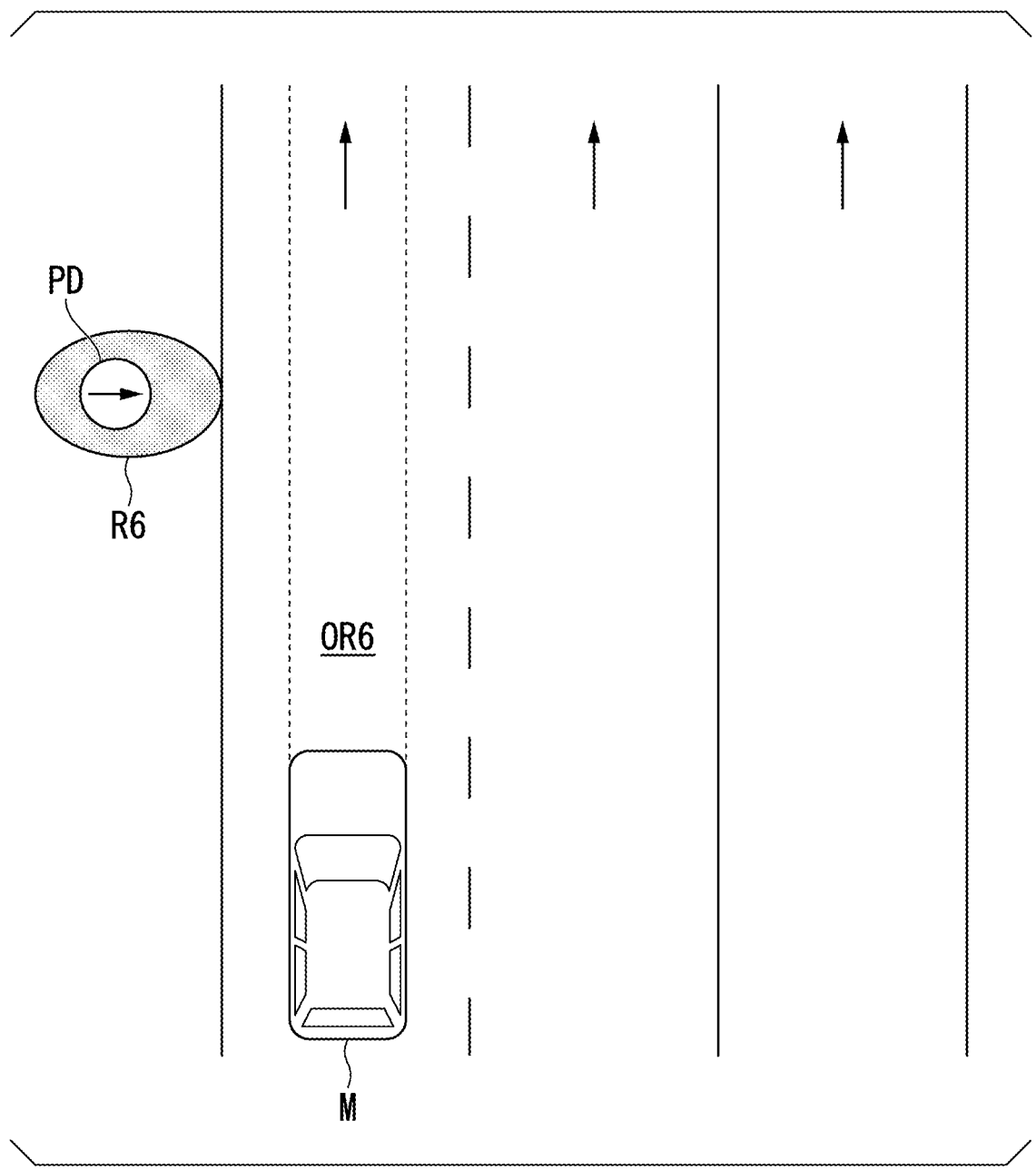
FIG. 10 is a diagram showing an example of a risk region which is set in a case where the width of a roadway is equal to or greater than a threshold value.

FIG. 10 is a diagram showing an example of a risk region which is set in a case where the width of a roadway is equal to or greater than a threshold value. FIG. 10 is different from FIG. 9 in that the width of a roadway is equal to or greater than a threshold value. In a case where the width of the roadway is equal to or greater than the threshold value, the corrector 146 corrects a risk region R5 to a risk region R6. The risk region R6 is a region smaller than the risk region R5 and is a risk region corrected not to protrude toward the roadway. The risk region R6 does not overlap the future scheduled traveling track of the vehicle M. In this case, the vehicle M sets a scheduled traveling track OR6 for traveling straight on a road and travels along the scheduled traveling track.

In a case where the width of a roadway is equal to or greater than a threshold value as described above, there is a low possibility that a pedestrian will enter the roadway, and thus a risk region based on the possibility is set. This is because, when the width of the roadway is relatively large, there is a low possibility that, for example, the pedestrian will cross the roadway or enter the roadway. The vehicle M can travel on a road on the basis of a risk region according to the surrounding environment.

In [Specific example 3], description has been given on the assumption that the corrector 146 corrects a risk region on the basis of the width of a roadway. Alternatively, a risk region may be corrected on the basis of the number of lanes. For example, in a case where the number of lanes is equal to or greater than a threshold value (for example, in a case where there are two or more lanes on each side or three or more lanes on each side), the corrector 146 may correct the risk region R5 to the risk region R6.

[Flowchart]

Figure 11:
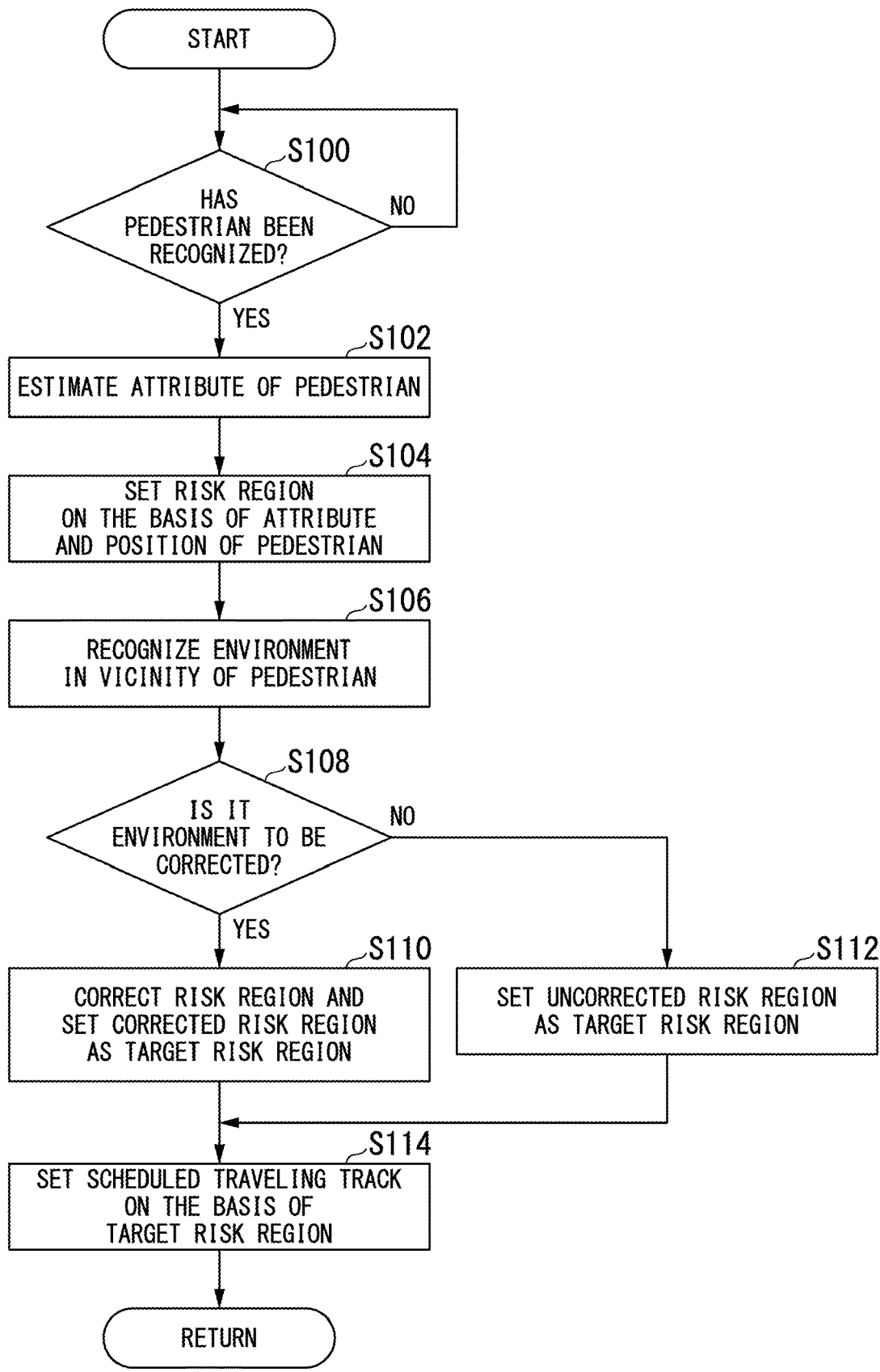
FIG. 11 is a flowchart showing an example of a flow of processing executed by an automated driving control device.

FIG. 11 is a flowchart showing an example of a flow of processing executed by the automated driving control device 100. First, the recognizer 130 determines whether or not a pedestrian who is present in the vicinity of a roadway (and the position of the pedestrian) has been recognized (step S100). In a case where a pedestrian who is present in the vicinity of the roadway has been recognized, the estimator 142 estimates an attribute of the pedestrian (step S102). Next, the setter 144 sets a risk region on the basis of the estimated attribute and the position (step S104). Next, the recognizer 130 recognizes an environment in the vicinity of the pedestrian (step S106).

Next, the corrector 146 determines whether or not the environment recognized in step S106 is an environment to be corrected (step S108). In a case where the environment is an environment to be corrected, the corrector 146 corrects the risk region which is set in step S104 and sets the corrected risk region as a target risk region (step S110). In a case where the environment is not an environment to be corrected, the corrector 146 sets the risk region which is set in step S104 as a target risk region (step S112).

Next, the action plan generator 140 sets a scheduled traveling track on the basis of the target risk region set in step S110 or step S112 (step S114). In addition, the automated driving control device 100 controls the vehicle M so that the vehicle M travels along the scheduled traveling track. Thereby, the processing of one routine of the present flowchart is terminated.

According to the first embodiment described above, the automated driving control device 100 can improve an occupant's feeling while riding in the vehicle by correcting a risk region on the basis of the width of a sidewalk or the width of a roadway around a traffic participant, which is a road environment recognized by the recognizer 130, and controlling the speed and steering of the vehicle M on the basis of the corrected risk region.

Second Embodiment

Hereinafter, a second embodiment will be described. In the first embodiment, the corrector 146 determines whether or not a risk region is to be corrected on the basis of an environment recognized by the recognizer 130. On the other hand, in the second embodiment, the corrector 146 determines whether or not a risk region is to be corrected on the basis of information associated with a road on which a pedestrian is present. Hereinafter, differences from the first embodiment will be mainly described.

FIG. 12 is a diagram showing an example of details of correction information 184A according to the second embodiment. The correction information 184A is information in which an environment of a road and a correction pattern are associated with each other for each link of the road. The environment of the road may be omitted. Positional information of the road may be associated instead of the link of the road. For example, a correction pattern 001 may be associated with a link RI001 of the road. The correction pattern 001 is a link in which a guardrail is present, similar to the correction information 184. An environment of the link associated with a correction pattern is an environment in which the width of a sidewalk is equal to or greater than a threshold value, an environment in which the width of a road is equal to or greater than a threshold value, an environment in which the number of lanes is equal to or greater than a threshold value, and an environment in which two or more environments among these environments are combined.

The corrector 146 determines a correction pattern on the basis of a road link of a position where a pedestrian is present with reference to the correction information 184A, and corrects a risk region.

According to the second embodiment described above, the corrector 146 can more simply correct a risk region by correcting the risk region on the basis of information associated with a road.

Third Embodiment

Hereinafter, a third embodiment will be described. In the first embodiment, description has been given on the assumption that the corrector 146 corrects the size of a risk region. On the other hand, in the third embodiment, the corrector 146 corrects a risk potential in a risk region. Hereinafter, differences from the first embodiment will be mainly described.

In the third embodiment, "correction of a risk region" means that a risk potential in the risk region is corrected. The "correction of a risk region" may mean that a risk potential in the risk region is corrected, in addition to the size of the risk region being changed.

Figure 13:
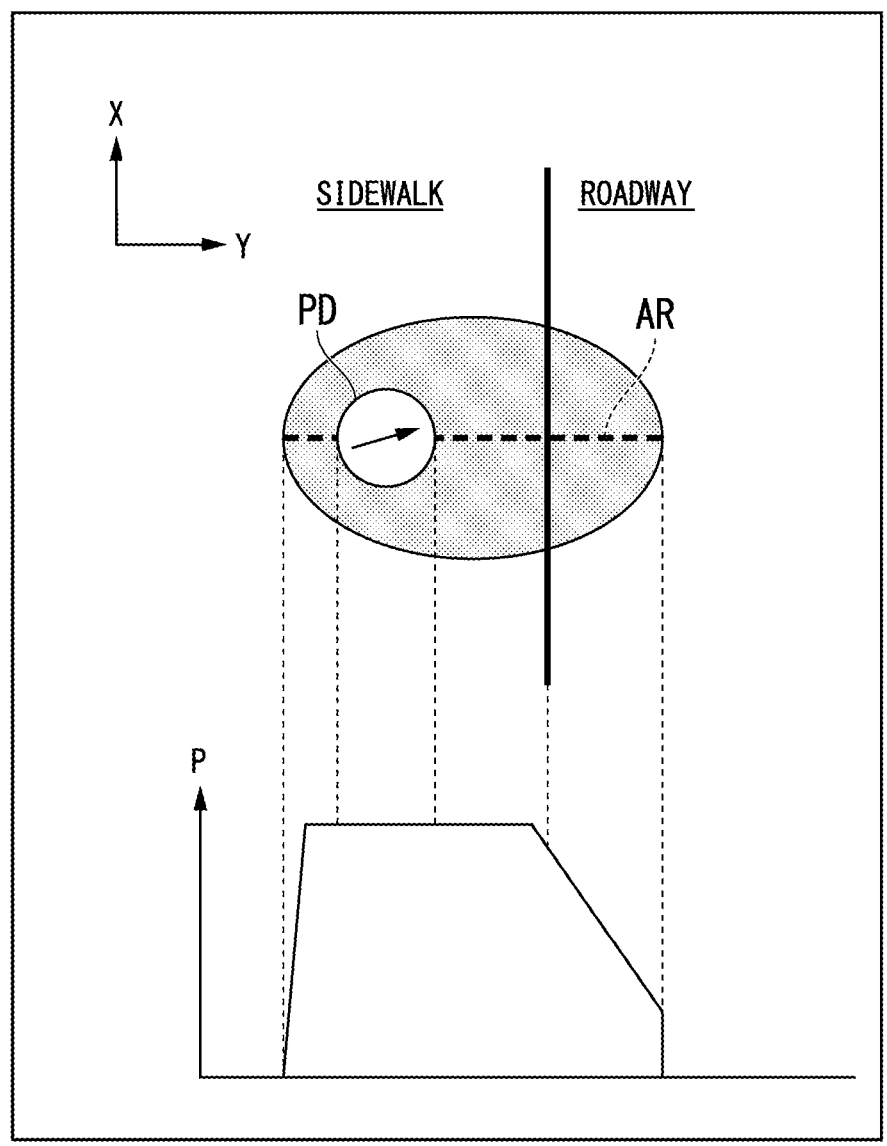
FIG. 13 is a diagram showing an example of the magnitude of a risk potential of a risk region in a case where a guardrail is not present.

FIG. 13 is a diagram showing an example of the magnitude of a risk potential of a region AR in a risk region in a case where a guardrail is not present. The region AR is a region extending in a Y direction and including a sidewalk and a roadway. For example, risk potentials at a position where a pedestrian PD is present and a sidewalk in front of the pedestrian PD are set to be higher than risk potentials of the other regions. A risk potential of a roadway is lower than the risk potential of the sidewalk and is set to become lower as a distance from the sidewalk increases.

Figure 14:
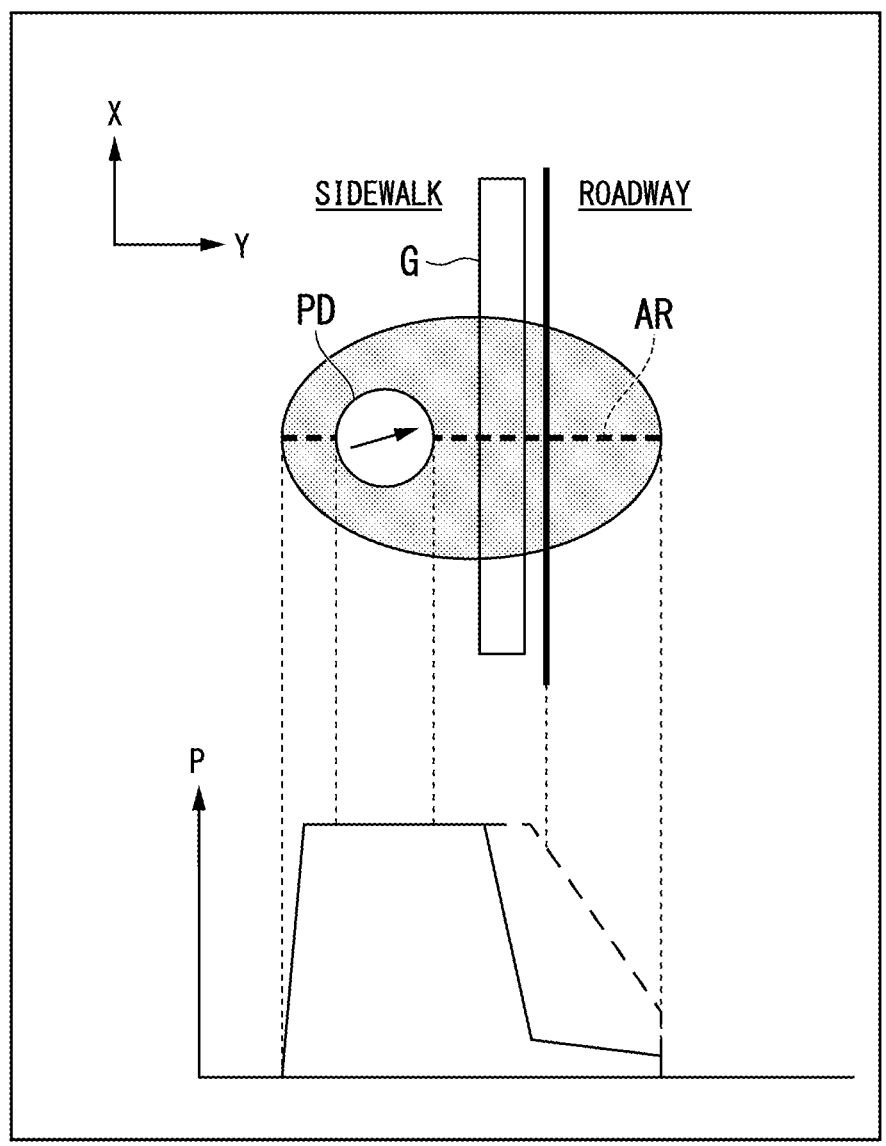
FIG. 14 is a diagram showing an example of the magnitude of a risk potential of a risk region in a case where a guardrail is present.

FIG. 14 is a diagram showing an example of the magnitude of a risk potential of a region AR in a risk region in a case where a guardrail is present. A risk potential of a region on a sidewalk side is equal to the risk potential on the sidewalk side in FIG. 13 described above. The risk potential on the roadway side is lower than the risk potential on the roadway side in FIG. 13 described above because the guardrail is present.

For example, it is assumed that control for causing the vehicle not to travel in a region in which a risk potential is equal to or greater than a threshold value is performed. It is assumed that the risk potential on the roadway side in FIG. 13 is equal to or greater than the threshold value, and the risk potential on the roadway side in FIG. 14 is less than the threshold value. In this case, the vehicle M can travel in a region in which a risk potential is less than the threshold value.

The vehicle M is controlled in accordance with the magnitude of a risk potential and the surrounding environment. For example, in a case where the vehicle M can travel by avoiding a region in which a risk potential exceeds zero, the vehicle M travels by avoiding the region. In a case where the vehicle M cannot avoid the region, the vehicle M may stop in front of the region, or may travel by decelerating to a speed corresponding to the magnitude of a risk potential and paying attention to a region in which a risk potential exceeds zero.

According to the third embodiment described above, the same effects as those in the first embodiment are exhibited. In the third embodiment, a case where a guardrail is present has been described, but the automated driving control device 100 may similarly reduce a risk potential of a risk region on a roadway side in a case where the width of the roadway or the width of a sidewalk is equal to or greater than a threshold value.

Fourth Embodiment

Hereinafter, a fourth embodiment will be described. In the fourth embodiment, the action plan generator 140 may control a vehicle on the basis of a road environment around a pedestrian. Hereinafter, differences from the first embodiment will be mainly described. In the fourth embodiment, for example, some or all of the estimator 142, the setter 144, and the corrector 146 may be omitted.

In a case where a road environment recognized by the recognizer 130 is not a target environment, the action plan generator 140 controls the vehicle M so that the vehicle M travels at a position distant from a pedestrian at a first distance in a width direction of a road. In a case where a road environment recognized by the recognizer 130 is a target environment and the width of the road is a second width larger than a first width, the action plan generator 140 controls the vehicle M so that the vehicle M travels at a position distant from the pedestrian at a second distance shorter than the first distance in the width direction of the road.

The target environment is the same as the environment to be corrected which is described in the first embodiment. The target environment is an environment in which a guardrail is present, an environment in which the width of a sidewalk is equal to or greater than a threshold value, an environment in which the width of a roadway in the vicinity of a pedestrian is equal to or greater than a threshold value, an environment in which the number of lanes of a roadway in the vicinity of a pedestrian is equal to or greater than a threshold value, or the like.

[Flowchart]

Figure 15:
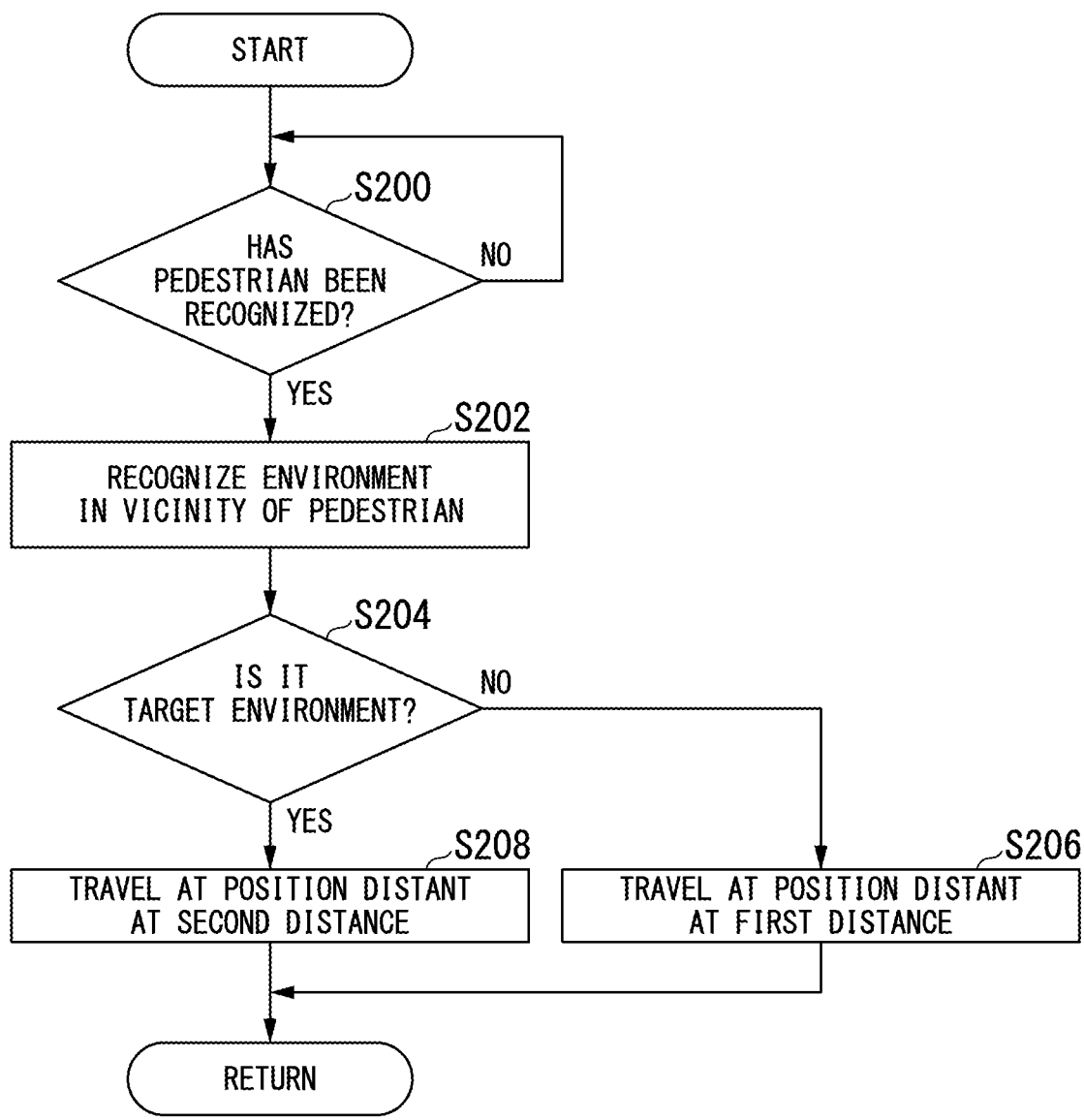
FIG. 15 is a flowchart showing an example of a flow of processing executed by an automated driving control device according to a fourth embodiment.

FIG. 15 is a flowchart showing an example of a flow of processing executed by the automated driving control device 100 according to the fourth embodiment. First, the recognizer 130 determines whether or not a pedestrian who is present in the vicinity of a roadway has been recognized (step S200). In a case where a pedestrian who is present in the vicinity of a roadway has been recognized, the recognizer 130 recognizes an environment around a position where the pedestrian is present (step S202).

Next, the action plan generator 140 determines whether or not the environment recognized in step S202 is a target environment (step S204). In a case where it is determined that the environment recognized in step S204 is not a target environment, the action plan generator 140 controls the vehicle M so that the vehicle M travels at a position distant from the pedestrian at a first distance in a width direction of a road (step S206). In a case where it is determined that the environment recognized in step S204 is a target environment, the action plan generator 140 controls the vehicle M so that the vehicle M travels at a position distant from the pedestrian at a second distance in the width direction of the road (step S208). The second distance is a distance shorter than the first distance. Thereby, the processing of one routine of the present flowchart is terminated.

According to the fourth embodiment described above, the automated driving control device 100 travels at an appropriate position in accordance with the width of a sidewalk or the width of a roadway, and thus the same effects as those in the first embodiment are exhibited.

Some functions included in the automated driving control device 100 may be mounted on other devices. For example, functions of some or all of the estimator 142, the setter 144, and the corrector 146 may be mounted on other devices. In this case, the automated driving control device 100 acquires processing results of the mounted functional units from other devices and performs various processes on the basis of the acquired processing results.

[Hardware Configuration]

Figure 16:
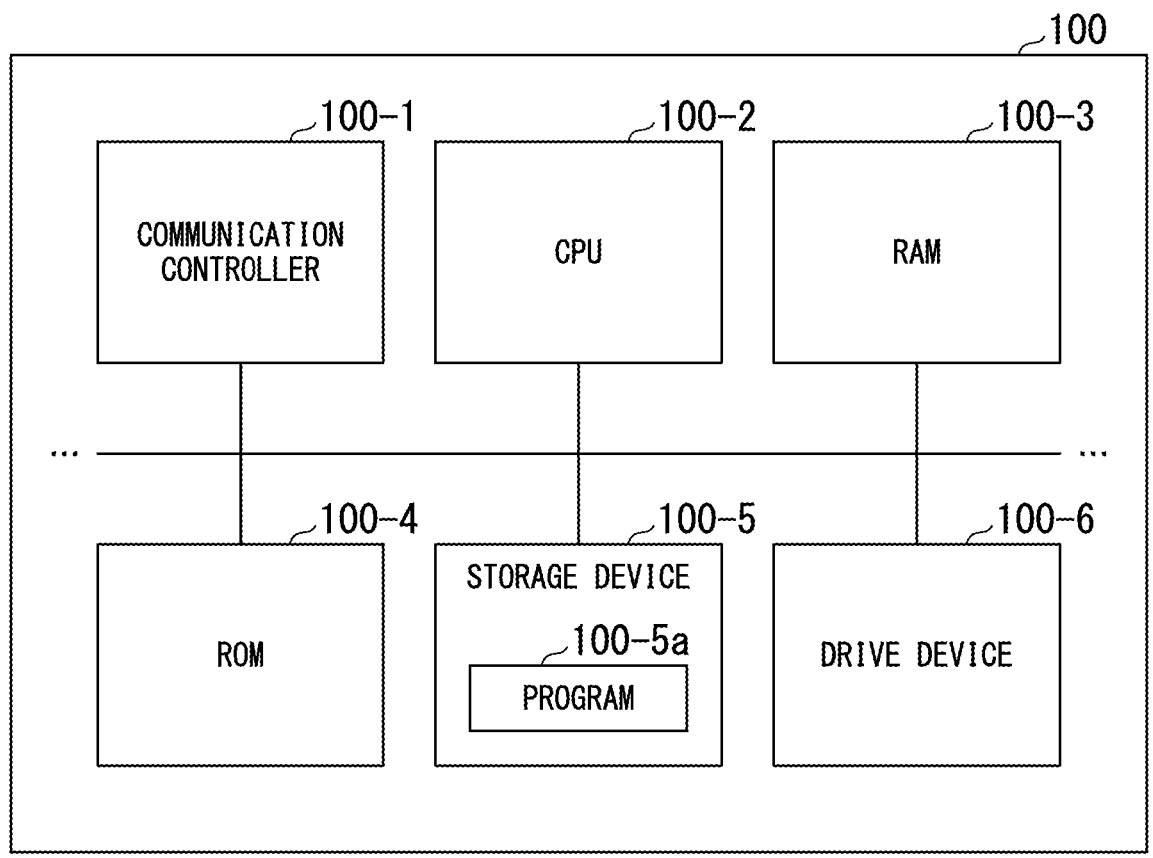
FIG. 16 is a diagram showing an example of a hardware configuration of the automated driving control device according to the embodiment.

FIG. 16 is a diagram showing an example of a hardware configuration of the automated driving control device 100 according to the embodiment. As shown in the drawing, the automated driving control device 100 is configured such that a communication controller 100-1, a CPU 100-2, a random access memory (RAM) 100-3 used as a working memory, a read only memory (ROM) 100-4 that stores a boot program and the like, a storage device 100-5 such as a flash memory or a hard disk drive (HDD), a drive device 100-6, and the like are connected to each other through an internal bust or a dedicated communication line. The communication controller 100-1 communicates with components other than the automated driving control device 100. A program 100-5a executed by the CPU 100-2 is stored in the storage device 100-5. The program is developed in the RAM 100-3 by a direct memory access (DMA) controller (not shown) or the like and executed by the CPU 100-2. Thereby, the first controller 120, the second controller 160, and some or all of the functional units included therein are realized.

The above-described embodiments can be expressed as follows.

A vehicle control device including:

a storage device that stores a program; and a hardware processor, wherein the hardware processor executes the program stored in the storage device so that the vehicle control device is configured to recognize at least a position of a traffic participant around a vehicle and a road environment around the traffic participant, set a risk region for the traffic participant on the basis of at least the recognized position of the traffic participant, correct the set risk region on the basis of a width of a sidewalk where the traffic participant is present or a width of a roadway around the traffic participant which is the recognized road environment, and control a speed and steering of the vehicle on the basis of the corrected risk region.

Although a mode for implementing the present invention has been described using the embodiments, the present invention is not limited such embodiments, and various modifications and replacements can be added without departing from the scope of the present invention.

What is claimed is:

1. A method for controlling a vehicle comprising:
   recognizing at least a position of a traffic participant around a vehicle and a road environment around the traffic participant,
   setting a risk region for the traffic participant based on at least the recognized position of the traffic participant,
   estimating a type of the traffic participant and a type of object that the traffic participant has,
   referring to correction information in which correction pattern is associated with a combination of the type of the traffic participant and the type of object that the traffic participant has,
   specifying the correction pattern according to the type of the traffic participant that is estimated, and the type of object that the traffic participant has and that is estimated,
   setting the risk region according to the correction pattern for the traffic participant based on at least the position of the traffic participant,
   correcting the set risk region based on a width of a sidewalk where the traffic participant is present or a width of a roadway around the traffic participant which is the recognized road environment, and
   controlling a speed and steering of the vehicle based on the corrected risk region,
   in a case where the width of the roadway is narrower than a second width, correcting the risk region to a first risk region having a first width, and
   in a case where the width of the roadway is equal to or greater than the second width, correcting the risk region to a second risk region having a second width which is narrower than the first width.

2. The method of controlling a vehicle according to claim 1, wherein the traffic participant is a pedestrian.

3. The method of controlling a vehicle according to claim 1, further comprising:
   in a case where the width of the sidewalk is larger than a first width, correcting the risk region so that the risk region becomes narrower than a risk region which is set in a case where the width of the sidewalk is the first width.

4. The method of controlling a vehicle according to claim 1, further comprising:
performing correction so that the risk region becomes narrower as the width of the sidewalk increases.

5. The method of controlling a vehicle according to claim 1, further comprising:
in a case where the width of the roadway is larger than the second width, correcting the risk region so that the risk region becomes narrower than a risk region which is set in a case where the width of the roadway is the second width.

6. The method of controlling a vehicle according to claim 1, further comprising:
performing correction so that the risk region becomes narrower as the width of the roadway increases.

7. The method of controlling a vehicle according to claim 1, further comprising:
controlling the vehicle so that the vehicle does not enter the risk region.

8. The method of controlling a vehicle according to claim 1, further comprising:
estimating an attribute of a recognized pedestrian,
setting the risk region in consideration of the estimated attribute of the traffic participant.

\* \* \* \* \*